Feb. 21, 1950 A. SVOBODA 2,498,309
MULTIPLYING LINKAGE
Filed April 1, 1946 3 Sheets-Sheet 1

INVENTOR
ANTONIN SVOBODA

BY *M. A. Hayes*
ATTORNEY

INVENTOR
ANTONIN SVOBODA

Feb. 21, 1950  A. SVOBODA  2,498,309
MULTIPLYING LINKAGE
Filed April 1, 1946  3 Sheets-Sheet 3
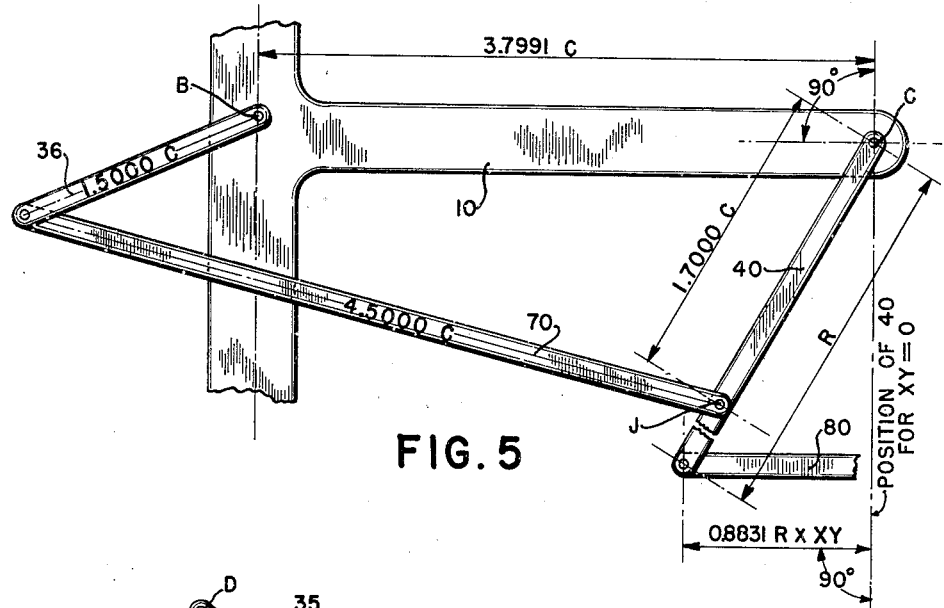
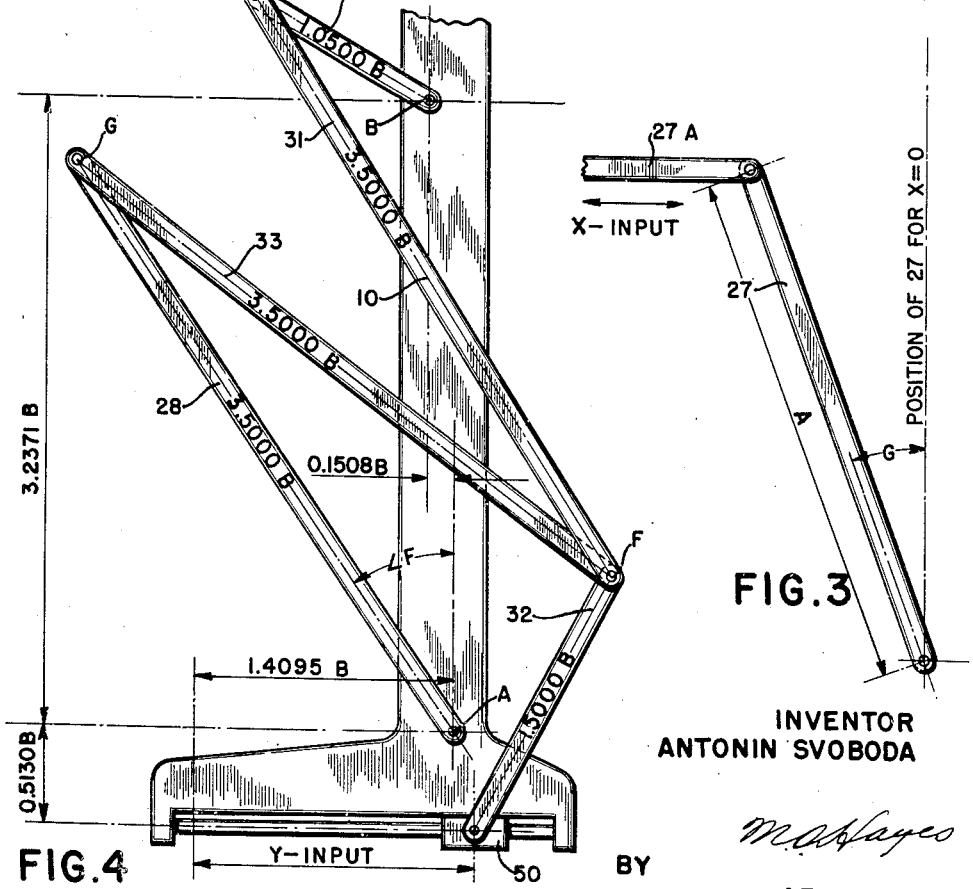
INVENTOR
ANTONIN SVOBODA
ATTORNEY Patented Feb. 21, 1950

2,498,309

UNITED STATES PATENT OFFICE 2,498,309

MULTIPLYING LINKAGE

Antonin Svoboda, Cambridge, Mass.

Application April 1, 1946, Serial No. 658,597

2 Claims. (Cl. 235—61)

This invention relates to a multiplying linkage and more particularly to such a linkage of the plus, plus-minus type in which the displacement of one member is a single valued non-linear function of the product of the displacement of two other numbers. The mechanism, which I have invented, determines the product of two independent variables, one of which may be either positive or negative and the other of which may be positive, for best precision.

For general information purposes in connection with the present invention, reference is made to the textbook, Computing Mechanisms and Linkages, vol. 27, by Antonin Svoboda, Massachusetts Institute of Technology, Radiation Laboratory Series, first edition 1948, McGraw-Hill Book Company, Inc.

An object of this invention is to provide a mechanical computer for determining the product of two independent variables.

Another object of this invention is to provide a mechanical computer for determining the product of two independent variables, one of which may be either positive or negative and the other of which is positive in character, which will automatically provide the proper sign to the product of the variables being multiplied.

A further object of this invention is to provide a mechanical computer having three slidable members and a linkage system operatively connecting the members, in which the relative dimensions of the members of the linkage system are such that displacement of one of the slidable members is proportional to the product of the displacements of the remaining slidable members.

Further objects and advantages of this invention, as well as its construction, arrangement, and operation will be apparent from the following description and claims in connection with the accompanying drawings, in which:

Fig. 3 is a side view of the input section shown in Fig. 2;

Fig. 4 is a side view of the second input section and guiding section illustrated in Fig. 2; and Fig. 5 is a side elevation of the output section illustrated in Fig. 2.

A mechanism embodying my invention which is based on this discovery comprises a linkage having the necessary critical relative dimension that the displacement of one of the members closely approximates the product of the displacement of two other members of the device. In order to make the nature of my invention clear, I will state the critical relationships referred to and describe the different mechanisms incorporating it in further detail.

Figure 1:
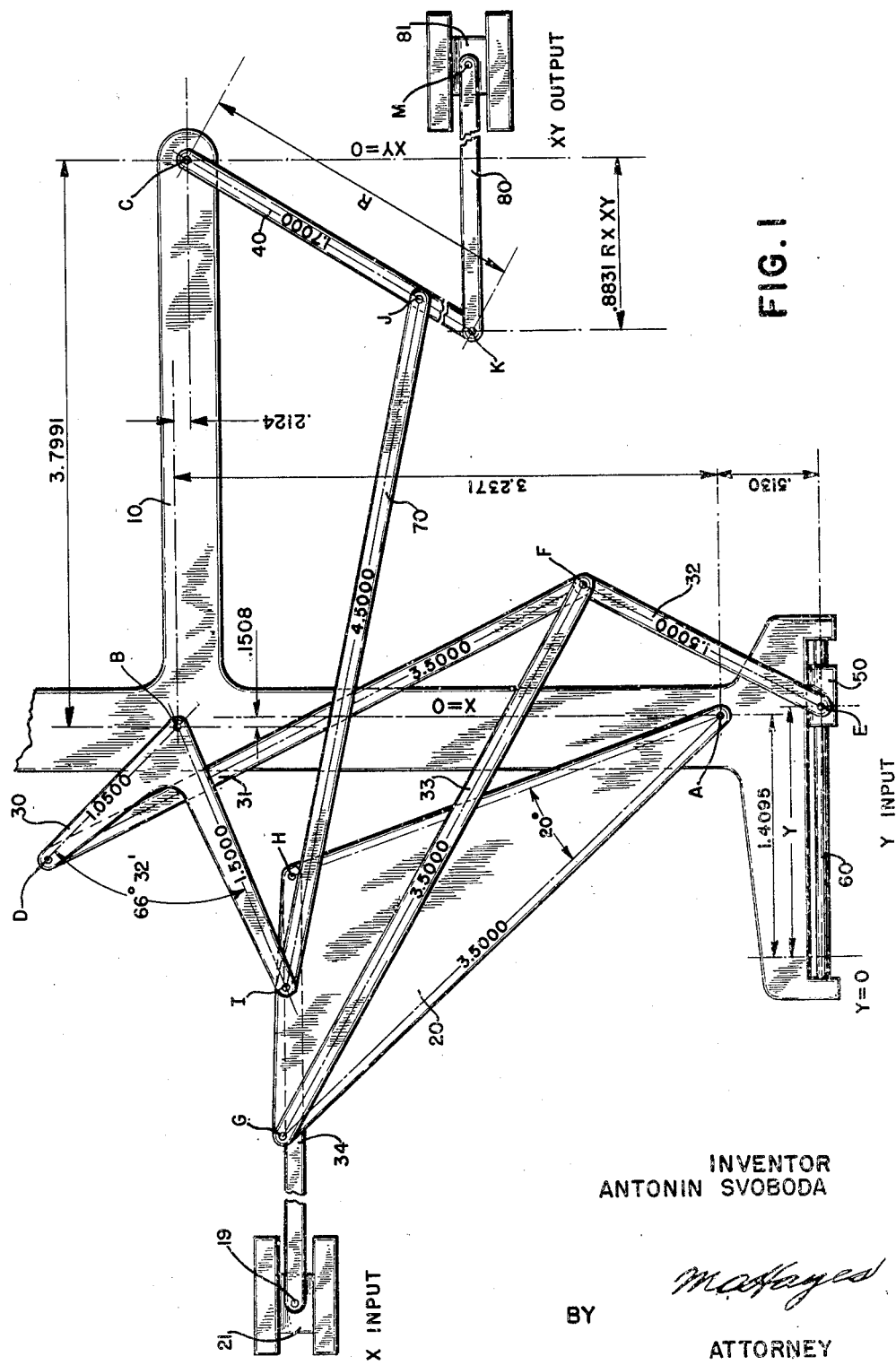
Fig. 1 is an orthographic assembly drawing of the linkage mechanism constructed according to the principles of this invention.

Fig. 1 shows the general arrangement of the mechanism and indicates that it includes three pivoted or swinging members 20, 30 and an arm 40, pivoted to a fixed support 10 at three pivots A, B, and C, respectively. A slide member 50 is slidably mounted upon a shaft 60 as a means for introducing one of the variable functions, the product of which when multiplied by a second variable function is to be determined by the device. A pair of links 31 and 32 pivotally mounted to members 30 and 50 at points D and E respectively, have their free ends joined by a pivot connection F. A link 33 has the opposite ends thereof pivotally connected to point G of member 20 and to point F as shown. A slide member 21 is operatively connected to member 20 by means of a link 34 having pivot connections at points 19 and H, respectively, this slide member providing a means for introducing the second variable function into the linkage. Point J of arm 40 is operatively connected to member 30 at point I by means of a link 70 having pivot connections at each end. A second link 80 has one end thereof pivotally connected to point K of member 40, the opposite end of member 80 being pivotally connected to a slide member 81 at point M. If we allow unity (1) to be the basis of comparison, the relative dimensions of the various linkages and swinging members of the device are such that movement of member 81 is a function of the product of the movement of members 21 and 50 respectively. The critical relative dimension of the various parts of the mechanism are as follows:

| | |
|---|---:|
| Horizontal distance from pivot point B to pivot point C | 3.7991 |
| Vertical distance from pivot point B to pivot point C | .2124 |
| Vertical distance from pivot point B to pivot point A | 3.2371 |
| Horizontal distance from pivot point B to pivot point A | .1508 |
| Vertical distance from pivot point B to the axis of travel of slide block 50 | 3.7501 |
| Horizontal distance from the point where the variable introduced by slide block 50 equals zero to point A | 1.4095 |
| Length of member 20 along the line A | 3.5000 |

Angle included between line AG and line
 AH of member 20 _____ 20°
Length of member 30 along the line BD __ 1.0500
Length of member 30 along the line BI ___ 1.5000
Angle included between lines BD and BI
 of member 30 _____ 66°32′
Length of link 31 _____ 3.5000
Length of member 32 _____ 1.5000
Length of member 33 _____ 3.5000
Length of member 40 from pivot point C
 to pivot point J _____ 1.7000
The total length of member 40 may be designated by the letter R, the only requirement being that the dimension R be greater than 1.7000, since it does not enter into the actual multiplying operation, but only changes the proportionality constant of the XY product.
Length of member 70 connecting points I
 and J of members 30 and 40, respectively _____ 4.5000

In the operation of the device, slide block 21 may be considered to be an X input member, the horizontal displacement of which constitutes the X input. Similarly, slide box 50 may be considered to be a Y input member, the horizontal displacement of which constitutes the Y input. For multiplication of X and Y, slide block 21 and slide block 50 are positioned as desirable and the output will be proportional to the product of the X and Y displacements. More specifically the output described is .8831R×XY, where R is, as shown, the total length of arm 40. The dimensions and orientation of the linkage members listed above are such that the X and Y input scales are linear in nature. The XY product output scale is also uniform, the displacement of the slider 81 being directly proportional to the product of X and Y. Assuming that the X and Y input scales are uniformly graduated in feet from 1 to 10, and the X and Y sliders are respectively positioned at 2 and 4, the output scale will be uniformly graduated such that it will indicate the value 8, after the factor .8831R has been taken into consideration.

Figure 2:
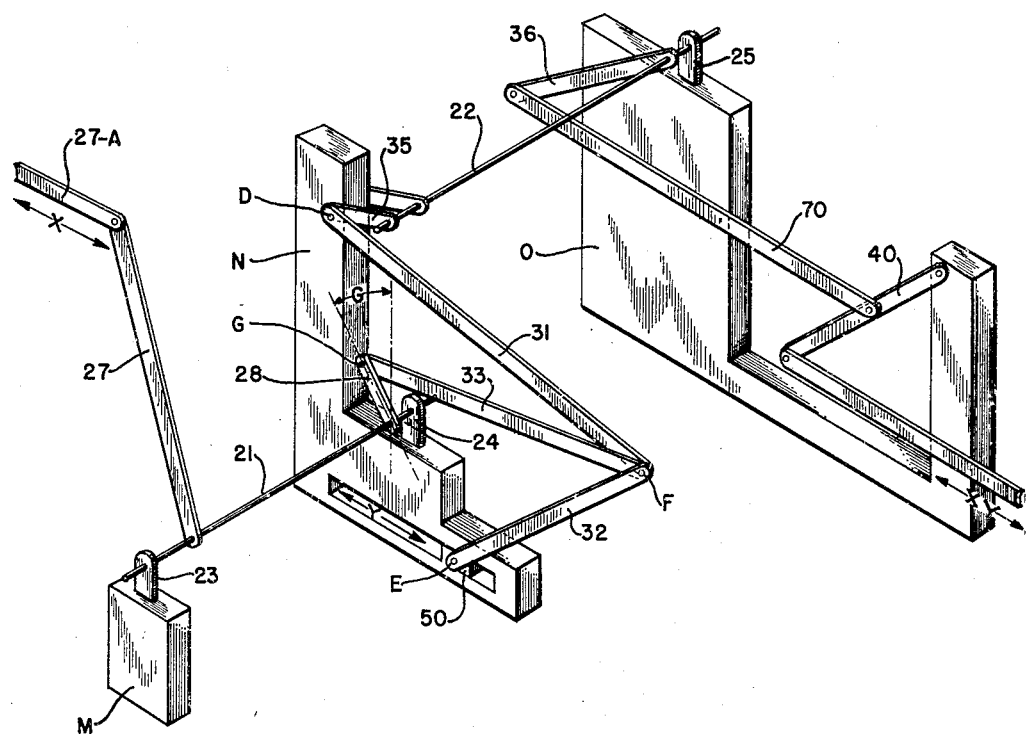
Fig. 2 is an isometric drawing of this invention in a more generalized form than that shown in Fig. 1.

As previously mentioned the dimension of R may be any value greater than 1.7000, whereby the proportionality factor .8831R may be any value as determined by the desired movement of the slider 81. Reference is now made to Fig. 2, which is an isometric drawing of the invention in more generalized form than that illustrated in Fig. 1. This embodiment of the invention may be easily considered in terms of an X input section, a Y input section, and locus determining means for a product point D, and an output section. Section M constitutes the X input section. Section N is the Y input section together with the locus determining means, and section O is the output section. While the functional operation of the embodiment shown in Fig. 2 is similar to that shown in Fig. 1, this latter embodiment differs from that of Fig. 1 in that it is constituted of three frameworks M, N, and O, having shafts 21 and 22 rotatably mounted in supports 23, 24, and 25, respectively, as means for operatively connecting the various linkages associated with each of the frameworks. In addition, triangular member 20 of Fig. 1 has been replaced by members 27 and 28 of Fig. 2, rigidly joined by shaft 21. These links 27 and 28 are equivalent to triangle 20 in that they are rigidly joined to shaft 21 and therefore will rotate to the same angle in response to rotation of shaft 21. Similarly, links 35 and 36 rigidly joined to shaft 22 are equivalent to the triangular member 30 of Fig. 1. It is to be noticed that the locus of point D, the product point, is in the present invention a circle, the radius of which is determined by the length of link 35. Since it is only the relative dimension of the various linkages that are critical, the X input section may be dimensioned in terms of a unit A, the Y input section and guiding section in terms of a unit B, and the output section in terms of a unit C, as illustrated in Figs. 3, 4, and 5. Further referring to Fig. 2, it is observed that if shafts 21 were temporarily severed and the members associated with framework M were rotated about an axis through shafts 21 with respect to the members associated with framework N, and the shaft rejoined, the computer would still function as before. The only requirement is that when X is zero, angle G (as defined in Figs. 2 and 3) must be 20°. Similarly, the absolute value of the angle between the members 35 and 36 as shown in Fig. 2 is not essential. The only requirement is that when the X and Y inputs equal zero, the XY scale must read zero. The zero position of the output section is illustrated in Fig. 5.

The relative dimensions of the X-input, Y-input, and XY-output sections in terms of factors A, B and C respectively, are as hereafter stated. Referring to Fig. 3, the dimensions of member 27, which is fixedly secured to shaft 21 may be given as the letter A. The length of member 27A is purely arbitrary and may be chosen to be any convenient dimension.

Referring to Fig. 4, the critical relative dimension of the Y input and guiding sections, which are given in terms of a unit of measurement B, are as follows:

Vertical distance from pivot
 point A to pivot point B____ 3.2371B above
Horizontal distance from pivot
 point A to pivot point B____ .1508B to the left
The length of member 28 ____ 3.500B
The length of member 32 ____ 1.500B
The length of member 31 ____ 3.500B
The length of member 33 ____ 3.500B
The length of member 35 ____ 1.050B
The vertical distance from
 pivot point A to axis of slide-
 block 50 _____ .5130B below
Horizontal distance from pivot
 point A to the point at which
 the Y input introduced by
 slide-block 50 is zero_____ 1.4095B to the left The relative dimensions of the output sections of the computer are shown in Fig. 5 in terms of a unit of measurement C. They are as follows:

The length of frame 10 from pivot point
 B to pivot point C _____ 3.7991C
The length of member 36 _____ 1.5000C
The length of member 40 from point C to
 point J _____ 1.7000C
The length of member 40 may be designated by the letter R.
The length of member 70 _____ 4.5000C As previously stated, the displacement of the XY slide 80 is proportional to the product of the displacements of the X and Y sliders Nos. 21 and 50, respectively. Any convenient scales may be used on the X and Y sliders and the output scale will be determined thereby. The range of best precision over which the device operates, may be stated as follows:

The travel of the X input member should not exceed negative .35A nor exceed positives .35A, that is, the total range of travel of the X input member should not exceed .70A, where A is the length of link 27 and X is the actual X input, that is, the linear horizontal displacement of pin 19 which is a close approximation of the horizontal component of displacement of point H. Similarly, the Y input should be limited so that Y is not less than zero, nor more than 1.66B, where Y is the actual displacement of slider 50 and B is the dimensional unit for the members shown in Fig. 4. The range for the output section will be determined by the input range. When the linkage is operated over this prescribed range, the average error of the output over this range, which is uniformly distributed, is approximately .15%. The actual XY output in terms of the horizontal component of displacement of pin 19 is equal to .8831R times the product of the actual X and Y input displacement.

It is to be understood that various changes and modifications may be made in this invention without departing from the spirit and scope thereof as set forth in the appended claims.

What is claimed is.

1. A mechanical computer for determining the product of two independent variables, one of which may be either positive or negative and the other which is positive in sign, said computer comprising a support, first, second, and third swinging members pivotally mounted on said support, first, second, and third slide members slidably mounted on said support, a first link operatively connecting said first slide member and said first swinging member, second and third links operatively connecting said second slides and said second swinging member, a fourth link operatively connecting said first swinging member and the junction point of said second and third links, a fifth link operatively connecting said second and third swinging members, and a sixth link operatively connecting said third slide member and said third swinging member, said links and said swinging members having the following relative orientation and dimensions where the basis of comparison is taken as unity (1)

Length of said first swinging member from the pivot point thereof to the point of connection of said fourth link_____ 3.5000
Length of said second link_____ 1.500
Length of said third link_____ 3.500
Length of said fourth link_____ 3.500
Length of said fifth link_____ 4.500
Length of said second swinging member from the pivot point thereof to the point of connection of said third link. 1.050
Length of said second swinging member from the pivot point thereof to the point of connection of said fifth link__ 1.500
Angle included between the lines drawn from the pivot point of said second swinging member and the points of connection thereto of said third and fifth links_____ 66°32′
Angle included between lines drawn from the pivot point of said first swinging member and the points of connection thereto of said first and fourth links_____ 20°
Distance from the pivoted mounting of said third swinging member to the point of connection thereto of said fifth link._____ 1.700
Vertical distance between the pivot points of said first and second swinging members_____ 3.2371
Horizontal distance between the pivot points of said first and second swinging members_____ .1508
Horizontal distance between the pivot points of said second and third swinging members_____ 3.7991
Vertical distance between the pivot points of said second and third swinging members_____ .2124
Vertical distance between the pivoted connection of said second link to said second slide member and the pivot point of said first swinging member_____ .5130
Length of said third swinging member_____ R, where R>1.700 the pivotal mountings described above providing a displacement of said third slide member which is directly proportional to the product of the displacements of said first and second slide members, the proportion constant being .8831R.

2. A mechanical computer for determining the algebraic product of two independent variables X and Y, of which X may be either positive or negative and Y is positive in sign, said computer comprising, a support including a standard having an integral arm positioned coplanarly therewith and perpendicularly thereto, a triangular swinging member pivotally mounted at an apex on said standard in substantially coplanar relationship with said support, and X-input slide operatively connected to a first unpivoted apex of said triangular swinging member such that transverse movement of said X-input slide causes rotation of said triangular swinging member about its pivot point, said X-input slide having a scale calibrated in positive and negative values on either side of a zero position and being arranged such that said slide is at said zero position when a line connecting the pivot point and said first apex of said triangular swinging member is coincident with a line drawn through said pivot point parallel to the axis of said standard, a bell-crank member pivotally mounted on said standard in substantially coplanar relationship with said support, a Y-input slide member mounted on said support for movement along a scale transversely of the axis of said standard, said scale being uniformly graduated in positive values of Y from a zero position at an end of said scale, a linear swinging member pivotally mounted on said integral arm in substantially coplanar relationship with said support, a first link pivotally attached to a second unpivoted apex of said triangular member, a second link pivotally attached at one end to said Y-input slide member and at the other end to the free end of said first link, a third link pivotally attached at one end to a first unpivoted end of said bell-crank member and at the other end to the junction of said first and second links, a fourth link pivotally attached at one end to the second unpivoted end of said bell-crank member and at the other end to a point on said linear swinging member, and an XY-output slide operatively connected to the unpivoted end of said linear swinging member, a scale positioned adjacent said XY output slide being uniformly calibrated in positive and negative values on either side of a zero position, said scale being arranged such that said XY-output slide is at said zero position when the axis of said linear swinging member is coincident with a line drawn through the pivot point of said linear swinging member which is parallel to the axis of said standard, said links and said swinging members having the following relative dimensions where the basis of comparison is taken as unity (1), Length of said triangular swinging member from the pivot point thereof to the said second unpivoted apex thereof_____ 3.500
Length of said first link_____ 3.500
Length of said second link_____ 1.500
Length of said third link_____ 3.500
Length of said fourth link_____ 4.500
Length of said linear swinging member_____ R, R being greater than 1.700
Length of said linear swinging member from the pivot point thereof to the point of connection of said fourth link thereto_____ 1.700
Length of said bell-crank member from the pivot point thereof to the said first unpivoted end thereof_____ 1.050
Length of said bell-crank member from the pivot point thereof to the said second unpivoted end thereof____ 1.500
Angle included between lines drawn from the pivot point of said bell-crank member and the said first and second unpivoted ends thereof_____ 66°32′
Angle included between lines drawn from the pivot point of said triangular swinging member to the said first and second unpivoted apices thereof_____ 20°
Distance along the axis of said standard between the pivot points of said triangular and said bell-crank swinging members_____ 3.2371
Distance transversely of the axis of said standard between the pivot points of said triangular and said bell-crank swinging members_____ .1508

| | |
|---|---|
| Distance along the axis of said standard between said Y-input slide and the pivot point of said triangular swinging member | .5130 |
| Distance transversely of the axis of said standard between said zero point on said Y-input scale and the pivot point of said triangular swinging member | 1.4095 |
| Distance transversely of the axis of said standard between the pivot points of said bell-crank swinging member and said linear swinging member | 3.7991 |
| Distance along the axis of said standard between the pivot points of said bell-crank swinging member and said linear swinging member | .2124 |
| Range of movement of said X-input slide member for best precision | −.35 to .35 |
| Range of movement of said Y-input slide member for best precision | 0 to 1.68 |
| XY-output scale factor | .8831R | the aforementioned dimensions and orientation providing a displacement of said XY-output slide member which is directly proportional to the product of the displacements of said X-input and said Y-input members with an average error of .15% when the apparatus is operated over the range of best precision.

ANTONIN SVOBODA.

REFERENCES CITED

The following references are of record in the file of this patent:

UNITED STATES PATENTS

| Number | Name | Date |
|---|---|---|
| 2,229,156 | Wertheimer | Jan. 21, 1941 |
| 2,394,180 | Imm | Feb. 5, 1946 |

FOREIGN PATENTS

| Number | Country | Date |
|---|---|---|
| 113,136 | Great Britain | Feb. 7, 1918 |
| 291,556 | Italy | Dec. 19, 1931 |